C. K. SMITH.
TIRE ARMOR.
APPLICATION FILED MAY 5, 1915.

1,272,134.

Patented July 9, 1918.
2 SHEETS—SHEET 1.

Inventor
Charles K. Smith

Witnesses

By Victor J. Evans
Attorney

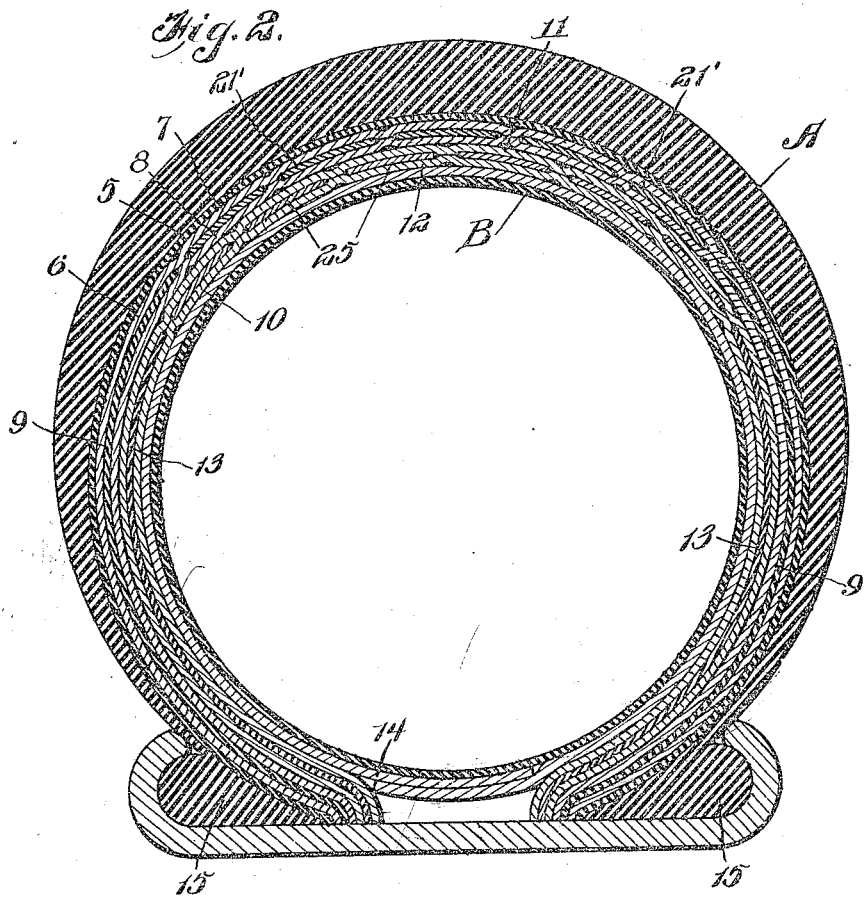
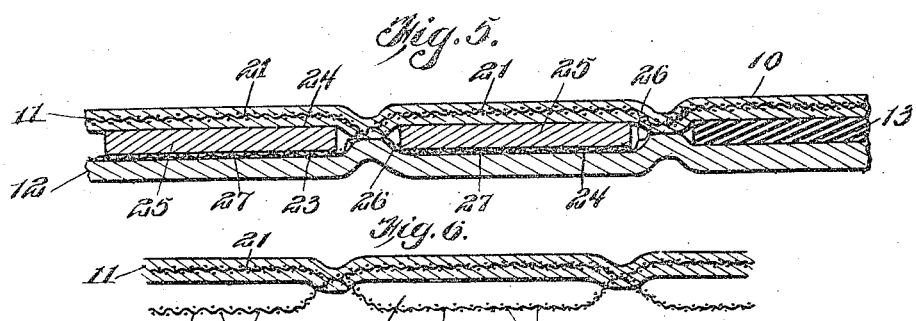

UNITED STATES PATENT OFFICE.

CHARLES K. SMITH, OF NIAGARA FALLS, NEW YORK.

TIRE-ARMOR.

1,272,134.	Specification of Letters Patent.	Patented July 9, 1918.

Application filed May 5, 1915. Serial No. 26,049.

*To all whom it may concern:*

Be it known that I, CHARLES K. SMITH, a citizen of the United States, residing at Niagara Falls, in the county of Niagara and State of New York, have invented new and useful Improvements in Tire-Armors, of which the following is a specification.

This invention relates to improvements in pneumatic tires and more particularly to that class thereunder known as tire armors, adapted for use on motor vehicles and the like and has for its object the provision of a shield disposed upon the inner periphery of the tire to prevent the perforation or puncture of the tube therein by contact with sharp or cutting bodies such as nails and glass, when the vehicle is propelled over the highways or streets.

In carrying out the invention, it is the further object to provide a generally improved non-puncturable tire of this class which is simple, cheap and efficient in construction, and adapted to provide increased durability and reduce the cost of maintenance.

A still further object of the invention is the provision of an armor constructed of a number of superposed layers, permanently united together in any desired manner, one or more of such layers constituting interwoven strands, certain of such strands being bent at spaced intervals to form the latter mentioned layers with a series of longitudinally disposed pockets for the reception of yieldable reinforcing strips.

The invention consists of certain novel details of construction, combination and arrangement of parts as will be now described and pointed out in the appended claim.

Referring to the accompanying drawing:—

Fig. 2 is a transverse section of the tire.

Fig. 5 is a transverse section taken through certain of the layers constituting my improved armor.

Fig. 6 is a view similar to Fig. 5, showing the lowermost layer omitted.

Figure 1:
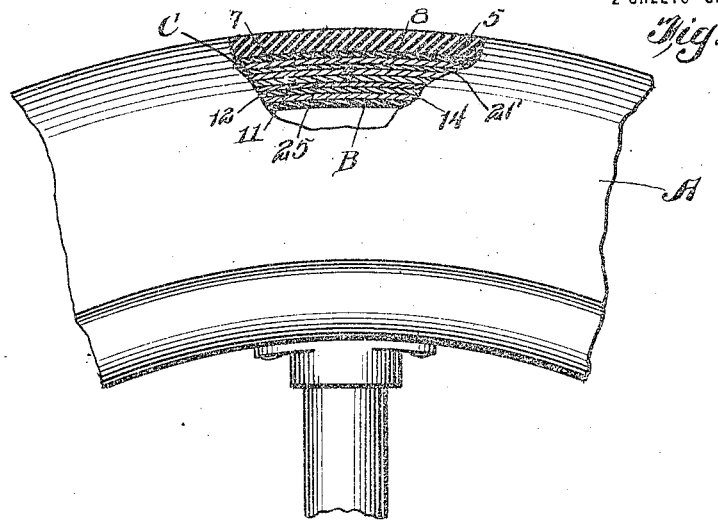
Figure 1 is a side elevation of a portion of the tire, a part of the exterior thereof being broken away to illustrate the armor within.
Figure 3:
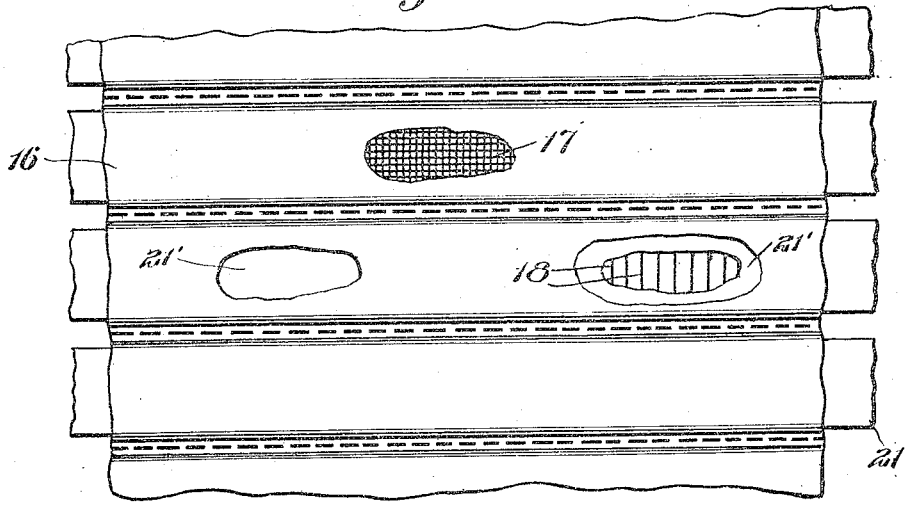
Fig. 3 is a plan view of one of the sections of the armor illustrating the manner of constructing the same to define therein pockets, a portion of the shield being broken away to illustrate yieldable bands or strips disposed in said pockets.

Referring more particularly to the drawing, A designates the tire, B the inner tube and C the improved tire armor, the latter being interposed between the tire and said tube.

The tire armor C in this particular instance may be separated from the tire A or may be formed as an integral part of the inner periphery of such tire, if desired by vulcanizing the armor thereto while the tire is in a plastic state. The said armor C comprises a top layer 5 made of rubber, a section 6 vulcanized to the layer 5, and the said section 6 including top and bottom layers 7 and 8 respectively. The material of which the said sections is composed and the manner of forming the same will be hereinafter more fully described. The said top layer 7 and bottom layer 8 of the section 6 are vulcanized together by means of a thin layer of rubber 9. Superposed beneath and united with the layer 5 and section 6 is a second section 10, which includes a top layer 11 and a bottom layer 12, the material and structural formation of this section being substantially identical with that of the section 6, which I desire to more fully describe hereinafter. These latter mentioned layers 11 and 12, of the section 10, are vulcanized together by a thin layer or sheet of rubber 13. The bottom layer constituting the tire armor is composed of a thick piece of canvas 14. It will of course be understood that each of the layers above referred to and constituting my improved tire armor, is of a length to permit the same to embrace and engage with the entire inner periphery of the tire and terminate flush with the heel portions 15 of the tire.

The layers 7 and 11 of the sections 6 and 10 are formed of fabric having woven therein wire fabric 17 and 21 respectively, formed of longitudinal and transverse strands. The layers 8 and 12 of the sections 6 and 10, respectively, are formed of canvas and are united with the layers 7 and 11, respectively, by the sheets 9 and 13 of rubber, the union being accomplished by vulcanizing. The rubber sheets do not extend entirely across the tire, thereby leaving the central portions of the layers of each of the sections ununited. The central portions of the layers 7 and 8 and the layers 11 and 12 are secured together at intervals to provide circumferential pockets 20 and 24, the pockets 24 being in staggered relation to the pockets 20 as shown in Fig. 2.

Figure 4:
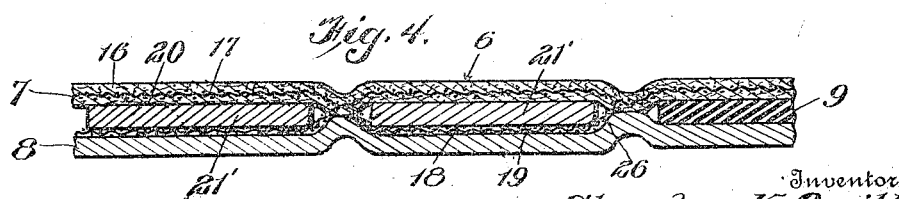
Fig. 4 is a transverse section through the section of the shield illustrated in Fig. 3 of the drawing, clearly illustrating the formation of the pockets.

Certain of the transverse strands of the fabric 17 and 21 are depressed from the body of the fabric to extend downwardly and lie along the bottom faces 18 and 27 of the pockets 20 and 24, as shown at 19 and 23. Thin, resilient strips 21' and 25 are disposed within the pockets 20 and 24, respectively. When the sections 6 and 10 are in superposed position the strips 21' and 25 will be in staggered relation and will prevent the penetration of a sharp object. The inner surfaces 26 of the depressed portions 19 and 23 of the strands of the fabric 17 and 21 are disposed at the side walls of the pockets 20 and 24 and frictionally engage the longitudinal edges of the strips 21' and 25. The depressed portions 19 and 23 bear against the inner peripheries of the strips 21' and 25, respectively, for yieldably supporting them within the pockets. If desired, the depressed portions 19 and 23 may have longitudinal strands interwoven therewith as shown in Figs. 4, 5 and 6.

It will be appreciated that the respective yieldable strips 21' and 25 further tend to increase the resiliency of the tire, when subjected to undue strains.

A tire constructed in accordance with this invention will be found to possess all qualifications desirable or necessary in a pneumatic tire, and in addition thereto, it will be found indestructible by punctures, bursting or other similar causes due to hard use or misuse, such as increasing the pressure within it excessively or riding the tire over sharp substances which under ordinary conditions would render the tire useless.

From the foregoing description, taken in connection with the accompanying drawing, the advantages of the construction and of the method of operation will be readily apparent to those skilled in the art to which the invention relates, while I have described the principles of operation of the device together with the device I now consider to be the best embodiment thereof, I desire to have it understood that the device shown is merely illustrative and that such changes may be made when desired as are within the scope of the claim appended hereto.

What I claim as new is:—

In combination with a tire, a shield comprising a plurality of superposed sections, each section being formed of two layers of fabric vulcanized together at their side portions and secured together at their central portions to provide circumferential pockets, a sheet of wire fabric in the outermost of said layers and having certain of its transverse strands depressed to enter into and lie along the inner faces of said pockets, and resilient strips disposed within said pockets and engaging said depressed strands and the outer faces of said pockets.

In testimony whereof I affix my signature in presence of two witnesses.

CHARLES K. SMITH.

Witnesses:
 HENRY A. CONSTANTINE,
 EDWARD P. HOWE.